(12) United States Patent
Starr et al.

(10) Patent No.: US 7,414,807 B2
(45) Date of Patent: *Aug. 19, 2008

(54) VARIABLE MOBILE MEDIA STORAGE SYSTEM

(75) Inventors: Matthew Thomas Starr, Lafyette, CO (US); Richard Douglas Rector, Arvada, CO (US); Mark Lorin Lantry, Fort Collins, CO (US); John David Barr, Superior, CO (US)

(73) Assignee: Spectra Logic Corporation, Denver, CO (US)

( * ) Notice: Subject to any disclaimer, the term of this patent is extended or adjusted under 35 U.S.C. 154(b) by 192 days.

This patent is subject to a terminal disclaimer.

(21) Appl. No.: 11/582,568

(22) Filed: Oct. 16, 2006

(65) Prior Publication Data

US 2007/0035869 A1   Feb. 15, 2007

Related U.S. Application Data

(63) Continuation of application No. 11/011,812, filed on Dec. 14, 2004, now Pat. No. 7,253,983.

(51) Int. Cl.
 *G11B 21/02* (2006.01)
(52) U.S. Cl. .................. 360/69; 711/111; 711/154; 711/170
(58) Field of Classification Search .......... None
See application file for complete search history.

(56) References Cited

U.S. PATENT DOCUMENTS 6,324,497 B1  11/2001  Yates et al.
6,490,648 B1 * 12/2002  Kaneda et al. ............... 711/4
6,779,077 B1  8/2004  Bakke et al.

(Continued)

FOREIGN PATENT DOCUMENTS

| WO | WO 02/27463 A2 | 4/2002 |
| WO | WO 2005/010661 A2 | 2/2005 |
| WO | WO 2006/065860 A2 | 6/2006 |
| WO | WO 2006/069183 A1 | 6/2006 |

OTHER PUBLICATIONS

U.S. Appl. No. 11/126,025, filed May 10, 2005, Rector et al.

(Continued)

*Primary Examiner*—Andrew L. Sniezek

(57) ABSTRACT

Disclosed is a method and apparatus for a variable media tape based storage system for storing, retrieving, and communicating data. The system includes at least one media element having a compatible relationship with one of a plurality of drives for storing and receiving data. The at least one media element configured to operate with the at least one drive as a functional pair is considered a loaded drive. The storage system also includes switch and mapping system, which in one embodiment could be an interface bridge processor, operatively linked to each of the plurality of drives. Finally, the storage system adapted to alter at least one received and accepted tape library command from positioning a target storage tape article for use with a target tape drive to selecting one of the loaded drives via the interface bridge processor. The interface bridge processor can be adapted to receive data in a streaming protocol to be saved on the target storage tape article by the target storage drive and convert the streaming protocol to a different protocol to save the data on the physically selected loaded drive.

18 Claims, 13 Drawing Sheets

U.S. PATENT DOCUMENTS

| | | |
|---|---|---|
| 2002/0144044 A1 | 10/2002 | Moon et al. |
| 2003/0177266 A1 | 9/2003 | Britton |
| 2004/0010544 A1 | 1/2004 | Slater et al. |
| 2004/0105187 A1 | 6/2004 | Woodruff et al. |
| 2004/0111251 A1 | 6/2004 | Trimmer et al. |
| 2004/0153614 A1 | 8/2004 | Bitner et al. |
| 2004/0223253 A1 | 11/2004 | Woodruff et al. |
| 2004/0264037 A1 | 12/2004 | Downey et al. |
| 2004/0264038 A1 | 12/2004 | Heineman et al. |
| 2004/0264039 A1 | 12/2004 | Armagost et al. |
| 2004/0264040 A1 | 12/2004 | Armagost et al. |
| 2004/0264041 A1 | 12/2004 | Kumpon et al. |
| 2004/0264042 A1 | 12/2004 | Pollard et al. |
| 2005/0007692 A1 | 1/2005 | Thompson et al. |
| 2005/0033911 A1 * | 2/2005 | Kitamura et al. ............ 711/111 |
| 2005/0047258 A1 | 3/2005 | Starr et al. |
| 2005/0063089 A1 | 3/2005 | Starr et al. |
| 2005/0065637 A1 | 3/2005 | Lantry et al. |
| 2005/0114598 A1 | 5/2005 | Hartung et al. |
| 2005/0185323 A1 | 8/2005 | Brace et al. |
| 2005/0195517 A1 | 9/2005 | Brace et al. |
| 2005/0195518 A1 | 9/2005 | Starr et al. |
| 2005/0195519 A1 | 9/2005 | Kumpon et al. |
| 2005/0195520 A1 | 9/2005 | Starr et al. |
| 2005/0219964 A1 | 10/2005 | Pollard et al. |
| 2005/0246484 A1 | 11/2005 | Lantry et al. |
| 2005/0256999 A1 | 11/2005 | Kishi et al. |
| 2005/0267627 A1 | 12/2005 | Lantry et al. |
| 2006/0010275 A1 | 1/2006 | Moon et al. |
| 2006/0064953 A1 | 3/2006 | Wong |
| 2006/0070059 A1 | 3/2006 | Starr et al. |
| 2006/0095657 A1 | 5/2006 | Rector et al. |
| 2006/0112138 A1 | 5/2006 | Fenske et al. |
| 2006/0134997 A1 | 6/2006 | Curtis et al. |
| 2006/0161936 A1 | 7/2006 | Permut et al. |
| 2006/0164928 A1 | 7/2006 | Starr et al. |
| 2006/0215300 A1 | 9/2006 | Starr et al. |

OTHER PUBLICATIONS

U.S. Appl. No. 11/145,768, filed Jun. 6, 2005, Downey et al.
U.S. Appl. No. 11/230,146, filed Sep. 19, 2005, Starr et al.
U.S. Appl. No. 11/240,893, filed Sep. 30, 2005, Starr et al.
U.S. Appl. No. 11/264,920, filed Nov. 2, 2005, Lantry et al.

* cited by examiner

VARIABLE MOBILE MEDIA STORAGE SYSTEM

CROSS-REFERENCE TO RELATED APPLICATIONS

This application is a continuation of U.S. Ser. No. 11/011,812, filed Dec. 14, 2004, the entire disclosure of which is incorporated herein by reference.

FIELD OF THE INVENTION

The present invention relates generally to retrieving data from, and storing data to, a variable medium storage system by means of communications intended for a tape library.

BACKGROUND

Tape libraries have historically been the primary storage devices for amassed digital data. This has been due in part because of the tape libraries' ability to store considerably large amounts of data in a cost-efficient and data-stable manner. Other types of storage systems containing alternative media such as disc drives, however, are beginning to gain momentum as a consequence of advancements in the technology. Disc drive-based systems generally facilitate an additional level of flexibility in the way data is stored. Depending on the configuration of the storage system, the random access functionality of disc drives can dramatically speed up data transfer between a host and storage system. Such advances are evident in a Virtual Tape Library (VTL) which is a leading alternative to the traditional tape library.

VTLs are generally promoted as faster, more versatile backup systems than the traditional tape-based libraries. A VTL works by emulating legacy tape libraries by operating with standard tape backup software, such as Veritas backup software from Veritas Corporation of Mountain View, Calif. Put simply, a VTL presents the appearance of a tape library of almost any make and model to a host.

FIG. 1 shows a prior art block diagram of the relationship between a VTL 100 and a host computer 102 over a network communications path 106. The VTL 100 is comprised of an array of disc drives 108 often configured in a RAID (Redundant Array of Independent Discs [drives]). Here, for purposes of simplicity, the VTL RAID system 108 is comprised of four disc drives 104. The disc drives 104 function as one virtual disc drive 120 capable of sharing a single article of data, such as a file, across multiple disc drives 104. This feature enables data to be saved and retrieved at fast rates because an article/s of data can be accessed in a parallel fashion. In the event a disc drive 104 fails in the RAID 108, the data on any given drive 104 can be reconstructed from redundant data on other disc drives 104 which provides a bonus feature over a conventional tape library. As previously discussed, the VTL 100 appears to be a tape library 110 to the host computer 102, which in this configuration, is constructed with three tape drives A 112, B 114 and C 116 and twenty-four tapes, or tape articles, such as tape article [1] 122.

In one example, the host computer 102 can communicate over the communications path 106 with the VTL 100, to query the configuration of the VTL 100. The VTL 100 can respond indicating that it is a tape library 110 with twenty-four tape articles and three drives (A 112, B 114 and C 116). The host 102 can communicate a request to send data packages to tape articles [1] 122, [2] 124 and [3] 126 to be loaded in tape drives A 112, B 114 and C 116, respectively. The host 102 receiving such a positive response over the communications path 106 from the VTL 100 sends data via the communications path 106 to the VTL 100 to be saved on tape articles [1] 122, [2] 124 and [3] 126. The VTL 100, in turn saves the data across the disc drives 104 in the RAID 108 as if they were three tape articles [1] 122, [2] 124 and [3] 126 on the virtual drive 120.

Unlike conventional tape libraries wherein tape articles can be removed from the library and archived and replaced with new or blank tapes to provide additional storage space, the VTL 100 is typically limited to the size of the RAID 108. This has been addressed by enlarging the RAID with additional disc drives 104 or adding additional RAID systems. The components and effort required to enlarge the RAID, however, often is substantially greater than that associated with increasing storage space in conventional tape libraries.

SUMMARY OF THE INVENTION

The present invention relates generally to retrieving data from and storing data to a variable medium storage system by means of communications intended for a tape library and overcomes the disadvantages and limitations of the prior art by providing a method and apparatus for directing data storage intended for a target tape article and target tape drive associated with the tape library to a selected mobile storage element and drive pair associated the storage system.

Embodiment of the present invention can therefore comprise a variable media tape based storage system comprising: a plurality of drives; at least one media element compatible with at least one of said drives for storing and receiving data wherein a loaded drive is one of said drives and said compatible media element configured to operate as a functional pair; a switch system and map system operatively linked to each of said plurality of drives; said storage system adapted to alter at least one received and accepted tape library command from positioning a target storage tape article for use with a target tape drive to selecting one of said loaded drives via said switch system and map system.

Embodiment of the present invention can further comprise a method for using a variable media tape based storage system comprising: receiving a command in streaming protocol from a host to position a first target tape article for use with a first target tape drive; selecting a first drive of a plurality of drives loaded with a first compatible media element; designating said loaded first drive with said first compatible media as said first target tape article positioned for use with said first target drive; responding to said host in said streaming protocol affirming said command is accomplished.

Embodiment of the present invention can further comprise a means for using a variable media tape based storage system comprising: means for receiving a command in streaming protocol from a host to position a first target tape article for use with a first target tape drive; means for selecting a first drive of a plurality of drives loaded with a first compatible media element; means for designating said loaded first drive with said first compatible media as said first target tape article positioned for use with said first target drive; means for responding to said host in said streaming protocol affirming said command is accomplished.

Embodiment of the present invention can further comprise a variable media tape based storage system comprising: at least one of a plurality of drives loaded with at least one media element having a compatible read and write relationship with said at least one drive; said storage system adapted to select said loaded drive in the place of a tape library command from a host to position at least a first target tape article for use with at least a first target tape drive and respond to said host that said library command is accomplished.

Embodiment of the present invention can further comprise a data storage system for storing and retrieving data for a host computer programmed to operate as a tape library comprising: at least one non-tape drive; a map system containing information regarding data stored in the system; and a switching element that directs, based on the map system, data to and from said drives such that said storage system operates as a virtual tape library.

Embodiment of the present invention can further comprise a data storage system comprising: at least one non-tape drive; a mapping means for representing information stored in the storage system as a virtual tape library; and a switching means linked to each of said drives.

DETAILED DESCRIPTION

Figure 1:
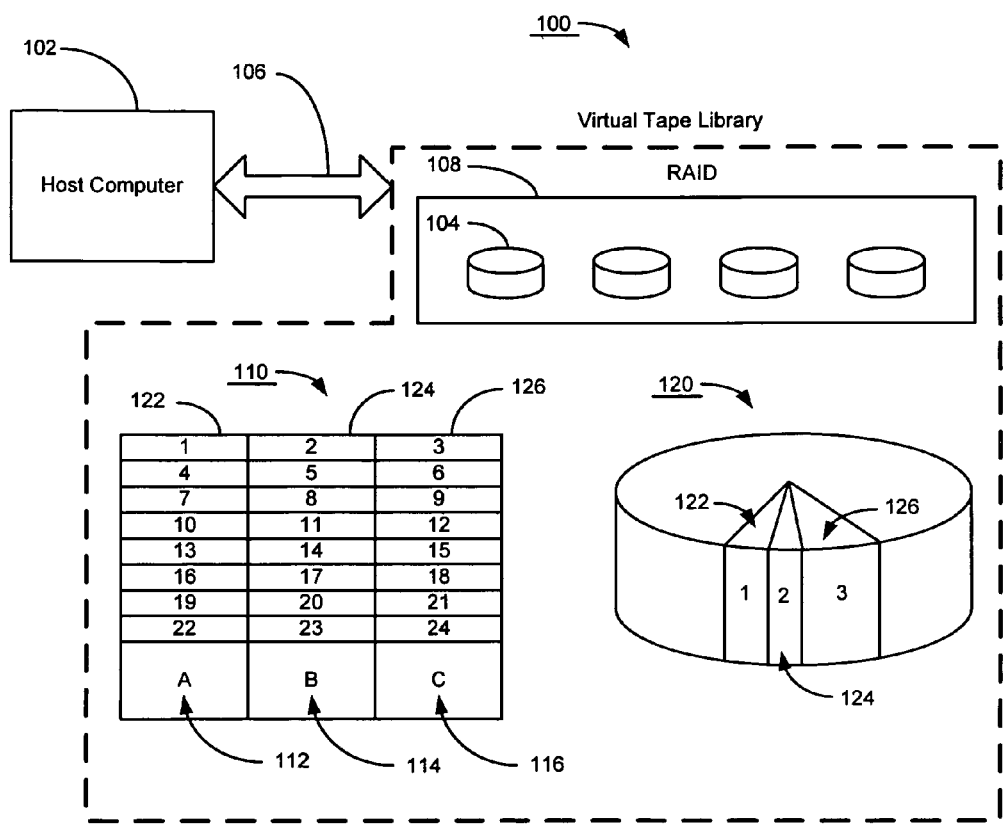
FIG. 1 is a block diagram of a prior art communicating Virtual Tape Library and a host computer over a network communications path.
Figure 2A:
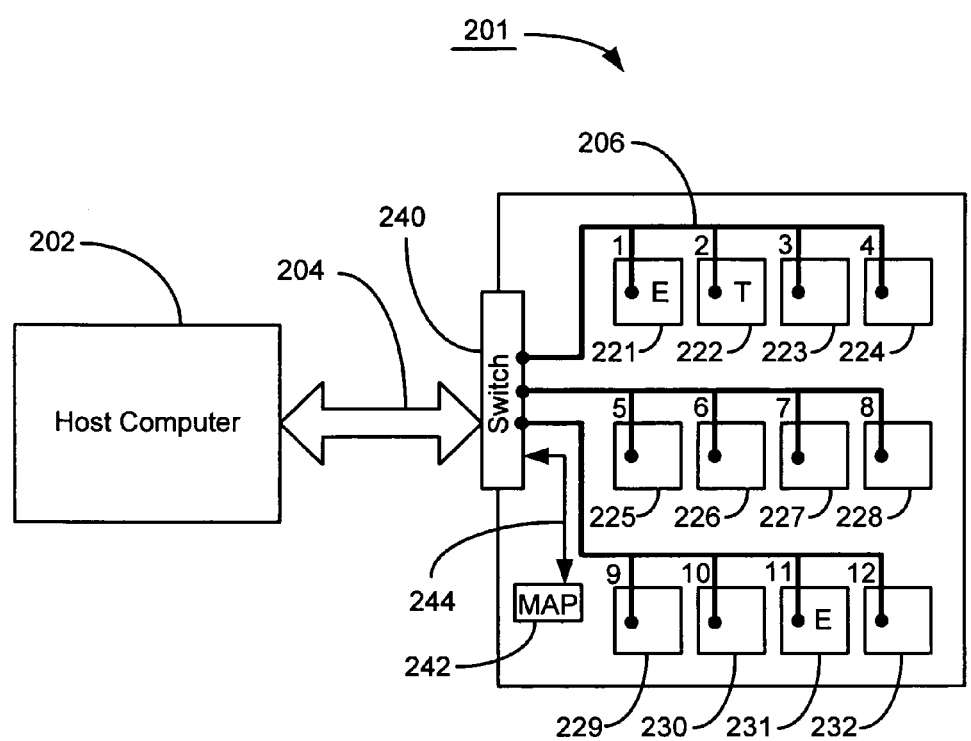
FIG. 2A is a block diagram of a variable media tape-based storage system in communication with a host constructed in accordance with an embodiment of the present invention using a switch and map system.

Referring to the drawings in general, and more specifically to FIG. 2A, shown therein is a block diagram of a variable media tape-based storage system 201 in communication 204 with a host computer 202 constructed in accordance with an embodiment of the present invention. In what follows, similar or identical structure is identified using identical callouts.

In the arrangement of FIG. 2A, the host computer 202 could be a personal computer, a mainframe computer, a server, or any computer system linked to the storage system 201, just to name a few examples. The communication path 204, at a minimum, needs only to facilitate communication between the host computer 202 and the storage system 201. The communication means could be accomplished by a dedicated pathway or, in an alternative embodiment, a pathway over a network for example. Furthermore, the communication path could be in the form of a wire line pathway, wireless, or a combination thereof, for example.

The storage system 201, in this embodiment, is comprised of a plurality of locations wherein drives can be disposed which, as shown here, can include at least one tape drive 222 and at least one disc drive magazine docking station 228. Each drive, such as the tape drive 222, is operatively linked for communication over a communications data path 206 to a switching system 240. In this case, the communications data path 206 is provided between the switching system 240 and the drives in each location, such as the empty location 232 for example. For illustrative purposes, the means for communicatively linking 206 the drives, such as the tape drive 222, to the switching system 240 is shown here to be accomplished by wires; however this could be done by wireless entirely or by a combination of wire and wireless, just to name some examples. The communications protocol means between the host 202 and the switch system 240 could be the same as or compatible with the communications data path 206 within the storage system 201, such as fiber channel for example, or different such as fiber channel at the arrow 204 and SCSI (Small Computer System Integration) across the communication links 206 in the storage system 200. In this configuration, there are twelve drive positions numbered consecutively with the following designations: [1] 221, [2] 222, [3] 223, [4] 224, [5] 225, [6] 226, [7] 227, [8] 228, [9] 229, [10] 230, [11] 231 and [12] 232. Drive positions [1] 221, [11] 231 and [12] 232 are empty or unloaded. In this embodiment, storage system 201 is in communication 204 with the host computer 202 via the switch system 240 which may be physically included with the storage system 201 or, alternatively, disposed outside the storage system 201. Finally, the storage system 201 is capable of storing and retrieving data for the host 202 as if the storage system 201 were a typical tape library capable of receiving and accepting tape library communications, such as SCSI tape protocol communication.

In this embodiment, the switch system 240 is operable with a map system 242 capable of altering the identification of each location wherein a drive can be disposed, such as location [1] 221 or [2] 222 for example. A map system is capable of defining, or mapping, any one of the locations as a target location to fulfill storage access request/s from the host 202. One example of a map system 242 is a software "mirror" of a tape library for example. Here, the map system 242 is in communication 244 with the switch system 240 in what is considered "in-band communication", which is communication over the data stream 206. In one example, the host 202 could request communications with a drive A loaded with tape media No. 3 by means of a normal tape library communications protocol, the map system 242 could go through the switch system 240 and designate loaded location [7] 227 as being drive A loaded with tape media No. 3 in the virtual sense, then the switch system 240 could create a path between the host computer 202 and the designated location [7] 227 for communications. In this example, the map system 242 is capable of renumbering the locations by a mapping means, such as a software program, to accommodate host 202 access commands, for example. In this embodiment the map system 242 is separate from the switch system 240. However, this is not a limitation, since the map system 242 and the switch system 240 could be physically and/or functionally combined.

Figure 2B:
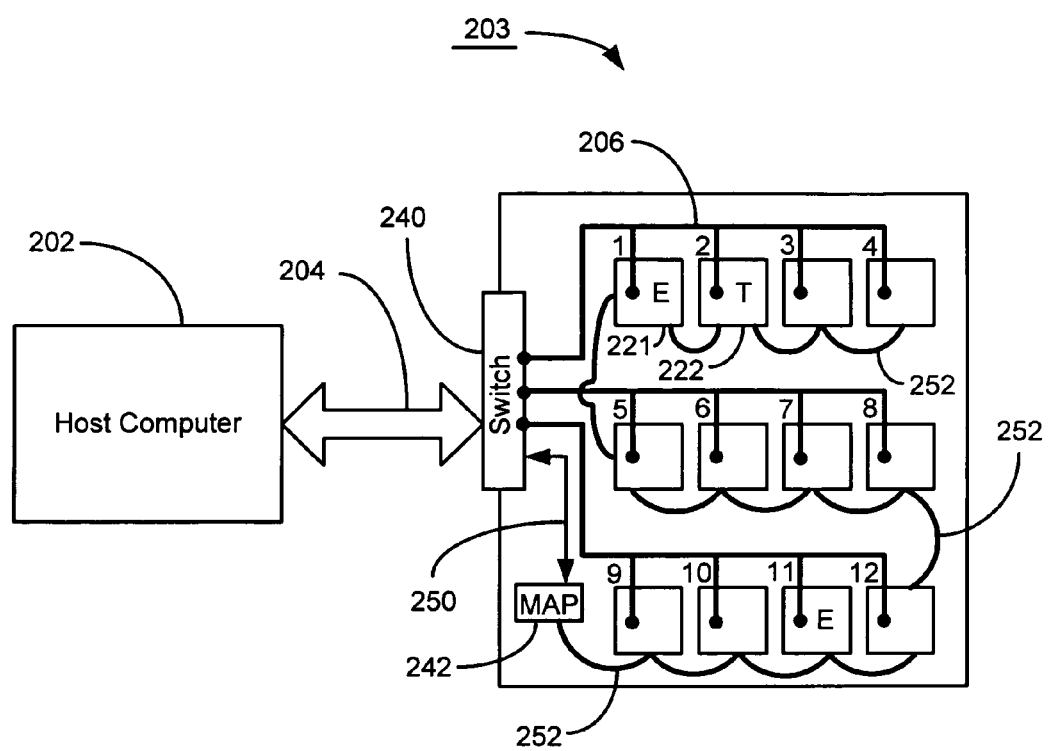
FIG. 2B shows an alternative embodiment of an out-of-band communications path mapping system for a storage system.

FIG. 2B shows an alternative embodiment of an out-of-band communications path mapping system 242 for the storage system 203. Here, the map system 242 could be linked 252 for communication with all of the locations capable of comprising storage devices, such as location [1] 221 or [2] 222 for example. The mapping of location for switching identification is over the out-of-band path 252 and not over the data path 206 or through the switch system 240. The mapping system 242, in this embodiment, is in communication with the host 202 through the switch system 240 over the path 250. It should be clear to a skilled artisan that the out-of-band mapping storage system 203 is illustrative and conceptually is not limited to the construction of FIG. 2B.

Figure 2C:
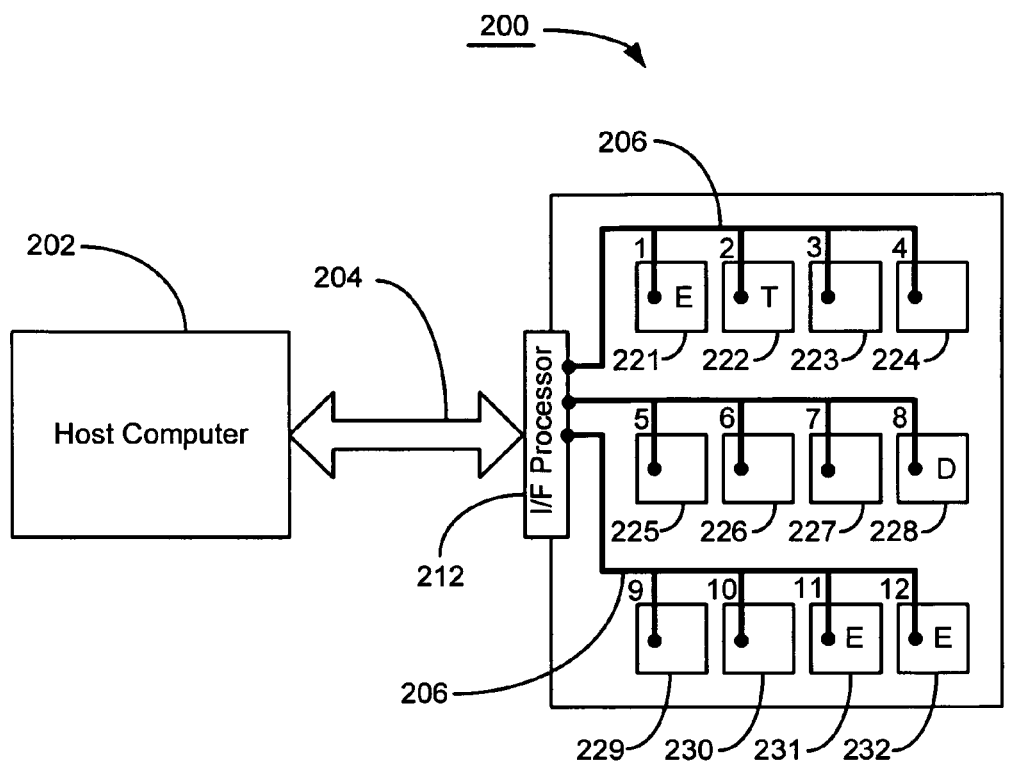
FIG. 2C is a block diagram of a variable media tape based storage system in communication with a host constructed in accordance with an embodiment of the present invention using an interface bridge processor system.

FIG. 2C shows an illustrative embodiment of the present invention wherein the mapping and switching functions are assumed in an interface bridge processor 212 in the storage system 200. The communication between the interface bridge processor 212 and the drives could be through a protocol specific to the storage system 200 and different from the communication protocol 204 from the host 202. The protocol specific to the storage system 200 could take into account the type communication link 206, drive addresses, such as drive [1] 221, or drive type, such as a tape drive 222 supporting a particular tape cassette (not shown) just for example.

Figure 3A:
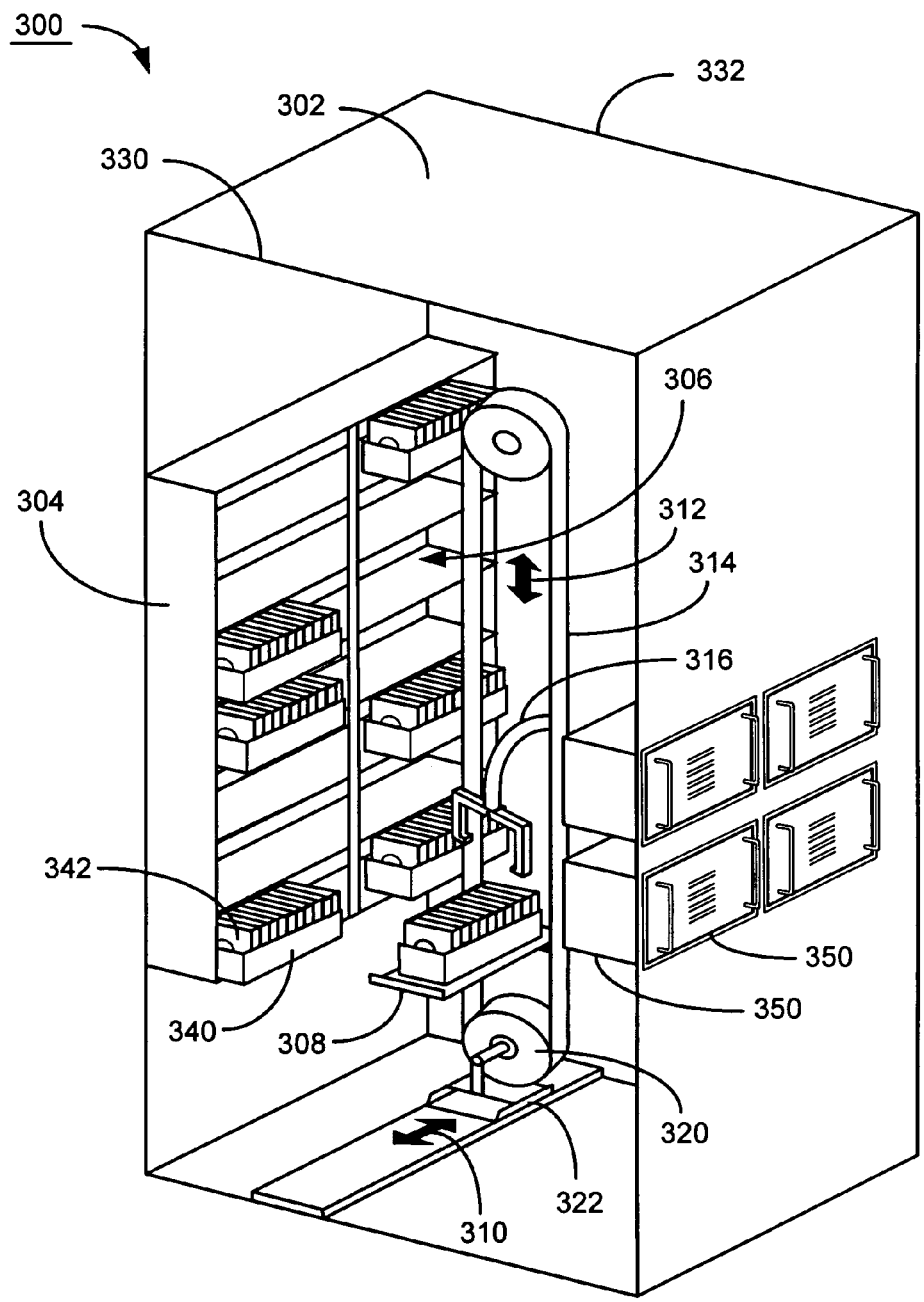
FIG. 3A is a pictorial representation of a typical tape library.
Figure 3B:
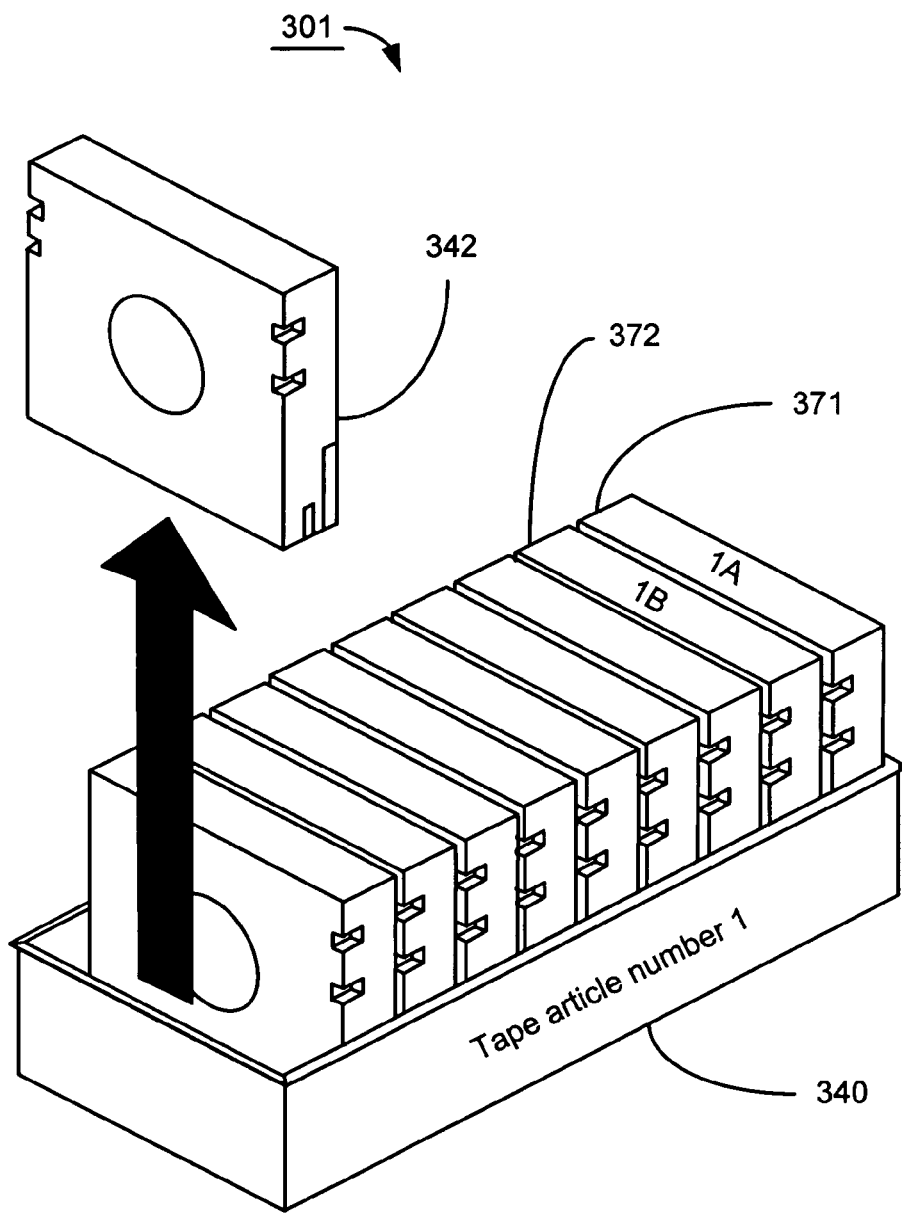
FIG. 3B is a perspective drawing of a tape media magazine article consistent with an embodiment of the present invention.

FIG. 3A has been provided to illustrate a typical tape library 300. Here, a tape library 300 can comprise a plurality of tape articles, such as a tape cassette 342, disposed in a cassette container 340. The tape library 300 is adapted with support structure 304 having storage locations 306 capable of accommodating the tape media, such as a target tape cassette 342, when not being used by a tape drive, such as a target tape drive 350. In this case, the support structure 304 is a shelving unit positioned inside of the library 300.

In this tape library 300, the target tape cassette 342 is supported by a tape cassette container 340 and can be transported from a storage location 306, and positioned to the target tape drive 350 for data storage use or from the target tape drive 350 back to the storage location 306. Here, the means for positioning the target tape cassette 342 is accomplished by a robotics device capable of positioning a grasping device, in this case a picker 316, and a magazine transporting support structure 308 to at least the storage locations 306 and tape drives, such as the target tape drive 350. In this example, the picker 316 and the magazine transport support structure 308 are connected to a belt 314 and motorized pulley system 320 capable of moving the picker 316 and support structure 308 up and down the tape library 300 as illustrated by the vertical two way arrow 312. The motorized belt 314 and pulley system 320 is supported by a horizontal transport system 322 capable of moving the picker 316 and support structure 308 to the front 330 and the back 332 of the library 300, as shown by the horizontal two way arrow 310. In this example, the components described in the tape library 300 are substantially contained within an enclosure 302.

In one illustration of the tape library 300, the positioning system 314, 320 and 322 positions the picker 316 to grasp and transfer a tape cassette container 340 containing the target tape article 342, from a storage location 306 to the magazine support structure 308. A target tape article 342, in this example, is a tape cassette containing information desired by a user or host 202. The positioning system 314, 320 and 322 then positions the tape cassette container 340 containing the target tape cassette 342 to the target tape drive 350 in a way to facilitate the picker 316 to transfer the target tape cassette 342 from the tape cassette container 340 in position for use with the target tape drive 350. The target tape drive 350 is generally the tape drive that the host 202 commands the tape library 300 to use with the target tape cassette 342.

In the above scenario, the single tape 342 can be considered a target tape article although in an alternative embodiment of the tape library 300, the entire tape magazine 301 could be considered a target tape article. In some tape libraries the tape magazine media element 301 is used as a single tape article organized to store data across multiple tape cassettes 342 in a tape cassette container 340 as if they were a single tape media element. For example, the tape magazine 301 could contain tape 1A 371, tape 1B 372, and so on, all being considered tape article 1 corresponding to the entire tape magazine article number [1] 301.

Figure 4:
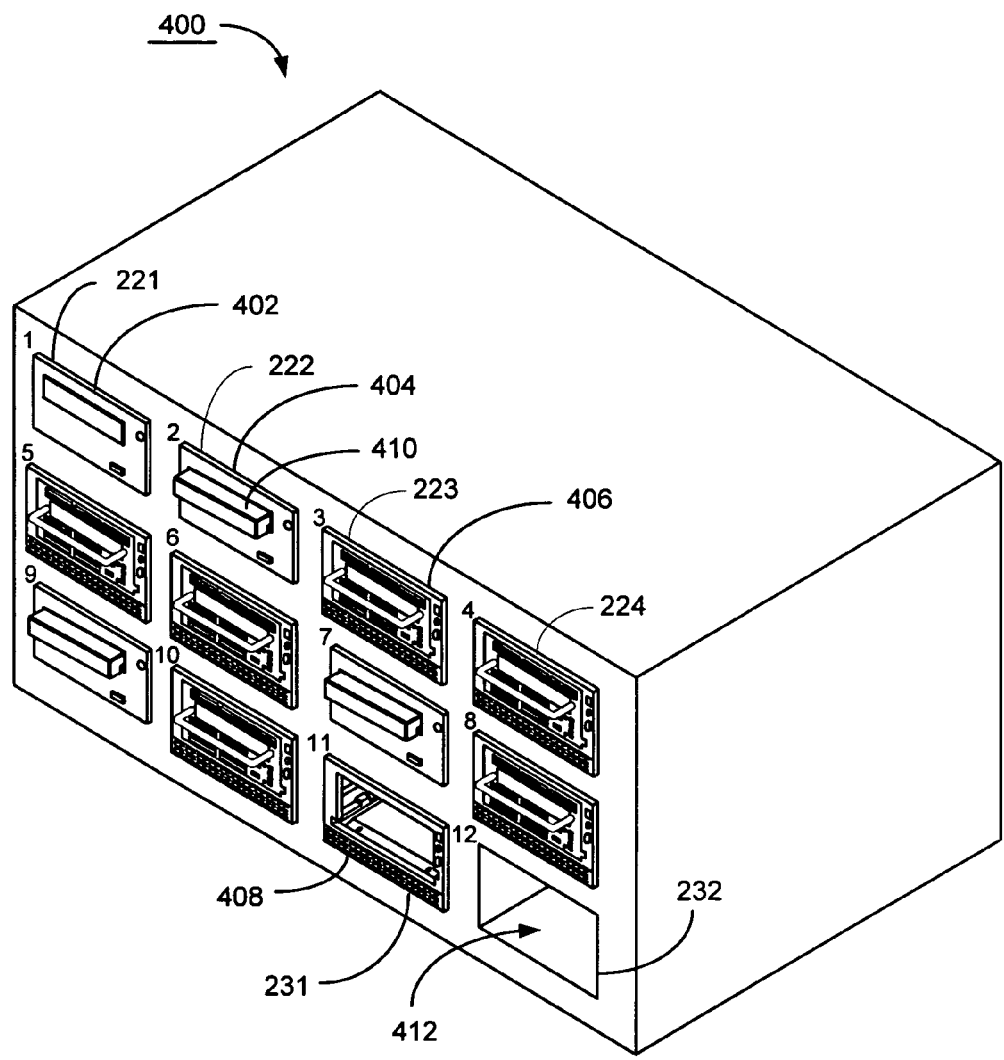
FIG. 4 is a perspective view of a combination tape and disk drive magazine storage system host constructed in accordance with an embodiment of the present invention.

While the claimed invention has utility in any number of different applications, the combination tape and disc drive magazine storage system 400 of FIG. 4 has been provided to illustrate a particularly suitable environment for the present invention. For purposes of illustration, this particular combination storage system 400 embodiment is constructed to be diagrammatically consistent with the storage system block diagram 200. Hence, the combination storage system 400 is constructed with twelve receiving bays 412 capable of substantially containing twelve drives numerically configured like FIG. 2A. This combination storage system 400 further comprises loaded tape drives 404, such as at location [2] 222, an unloaded tape drive 402 at location [1] 221, loaded disc drive magazine docking stations 406, such as at location [3] 223, an unloaded disc drive magazine docking station 408 at location [11] 231 and an empty bay 412 at location [12] 232 capable of receiving either the tape drive 402, the disc drive magazine docking stations 408 or some other drive adapted to function with the empty bay 412, such as a drive capable of reading and writing to optical media for example. A loaded drive is a drive and compatible media element configured to operate as a functional pair, such as the tape cassette 410 inserted in the tape drive 404 operating as a functional pair to store and retrieve data. As will be appreciated by a skilled artisan, mobile media storage elements can include digital magnetic floppy discs, digital compact discs, digital flash memory devices, and mobile disc drive magazines that can accommodate one or more disc drives. The combination storage system 400 is adapted to electrically connect all of the drives to an interface bridge processor 212. The means of electrical connection could be by wire connections, wireless, such as radio frequency for example, or any combination or equivalents thereof, just to name a few.

Figure 5A:
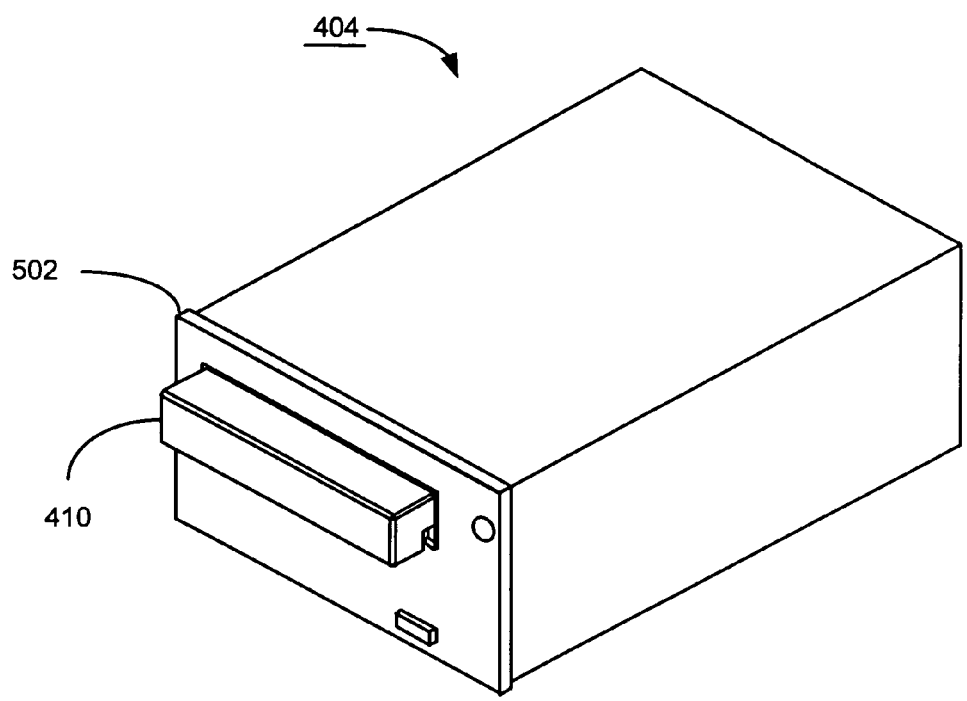
FIG. 5A is a perspective view of a tape drive accommodating a digital tape cassette consistent with embodiments of the present invention.

FIG. 5A shows perspective view of a loaded tape drive 404 in detail. Here, the loaded tape drive 404 is adapted to cooperate with the tape cassette 410 by partially containing the tape cassette 410 for storing and retrieving data. In this example, the cassette 410 is received by an opening in the face 502 of the tape drive 404. The tape drive 404 is capable of being engaged by a storage system 200 and electrically connected 206 with an interface bridge processor 212. As directed to the combination storage system 400, the tape drive 404 is capable of being proportioned to be engaged and substantially contained by one of the twelve bays 412.

Figure 5B:
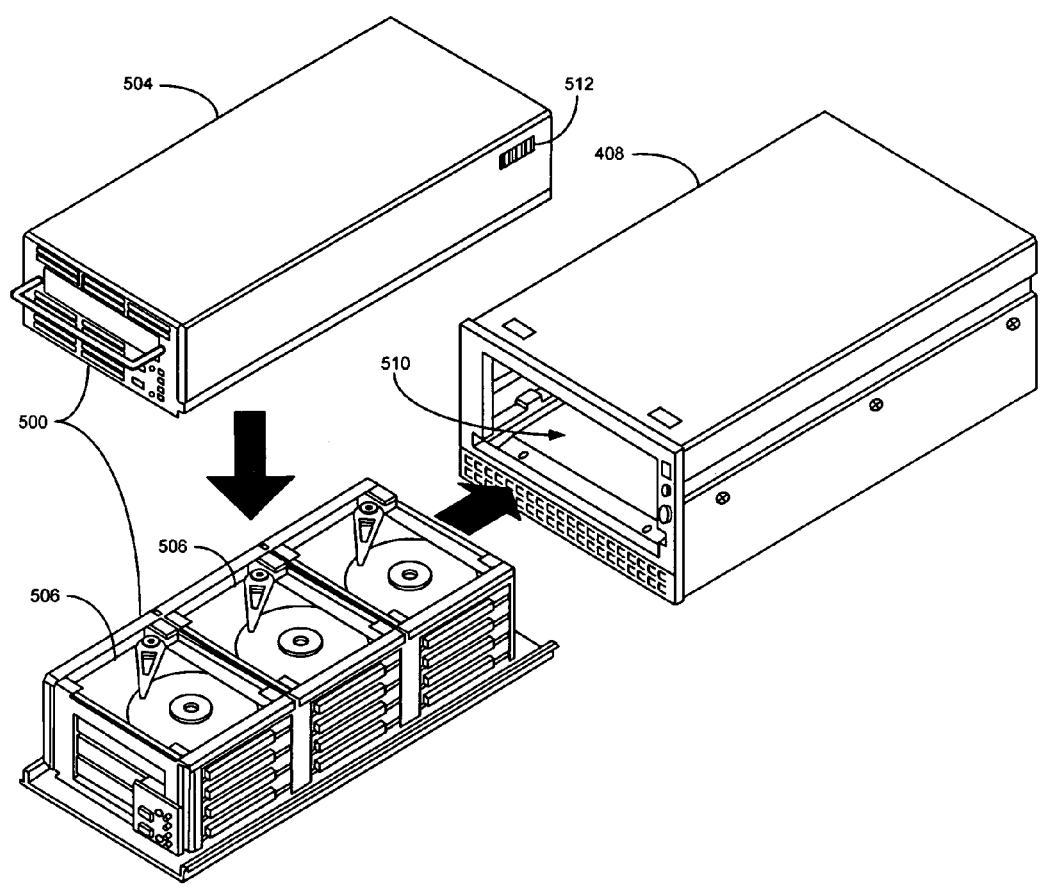
FIG. 5B is an exploded perspective view of a mobile disc drive magazine and disc drive magazine docking station consistent with embodiments of the present invention.

FIG. 5B shows an exploded perspective view of a mobile disc drive magazine 500 and a disc drive magazine docking station 408. Here, a plurality of disc drives 508 are substantially contained by an enclosure 504 generally comprising the mobile disc drive magazine 500. The mobile disc drive magazine 500 is adapted to be received by an opening 510 in the mobile disc drive magazine docking station 408. The insertion of the mobile disc drive magazine 500 into the disc drive magazine docking station 408 forms the loaded drive 408 and media element 500 pair 406. The disc drive magazine docking station 408 is capable of being electrically connected with the interface bridge processor 212, or other device/s by a coupling means via the disc drive magazine docking station 408, such as wires, wireless, plugs-in, or any combination or equivalence thereof, just to name a few examples. The enclosure 504 shows an example of an identification (ID) bar code 512 for identifying the mobile media element 500, such as for archiving in a remote storage location for example. In one embodiment, the mobile disc drive magazine 500 could be configured to operate as a RAID (Redundant Array of Independent Disc [drives]) device.

Figure 6:
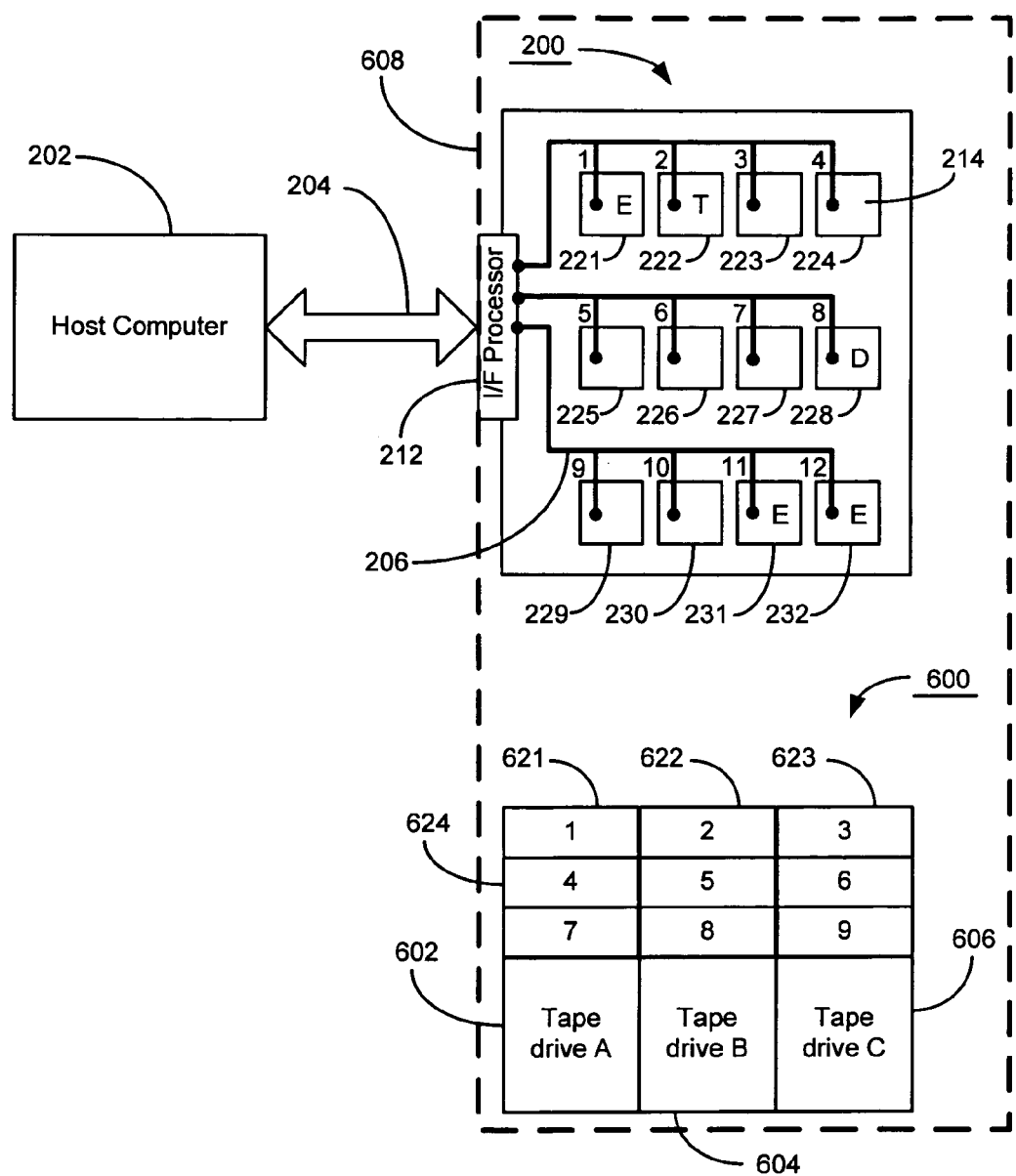
FIG. 6 is a block diagram illustrating a functionality embodiment consistent with embodiments of the present invention.

Referring now to FIG. 6, shown therein is a block diagram illustrating some functionalities of an embodiment of the present invention. Here, a host computer 202 is in communication 204 with the storage system 200 via the interface bridge processor 212. The interface bridge processor 212 is also communicatively linked 206 to all of the drives 214 of the storage system 200. The storage system 200 is capable of communicating 204 with the host computer 202 by using a streaming protocol, such as a SCSI tape protocol, as if the storage system 200 was a conventional tape library 600. The storage system 200, in turn, is capable of functioning based on its own internal storage system protocol. This variable protocol communication is accomplished through the interface bridge circuit 212 which acts as a translator capable of translating the two communication protocols between the host 202 and the storage system 200. Hence, the tape library block diagram 608 represents virtual communication between the host 202 and a tape library 600 wherein the actual communication is between the host 102 and storage system 200.

To better understand the communications relationship between the host computer 202 and storage system 200 as specifically pertaining to the operations of the illustrative storage system 200, a simplified example of the basic operations of an embodiment of the present invention will now be provided. For purposes of illustration, as previously described, the storage system block diagram 200 may diagrammatically represent the combination storage system 400. In this embodiment, storage system 200 is configured with nine loaded drives 214 which include loaded tape drives 404 and loaded disc drive magazine docking stations 406, for example. Here, the host computer 202 could query the storage system 200 to determine the physical configuration of the storage system 200 for purposes of sending specific storage related commands. The storage system 200 through the interface bridge processor 212 could reply that it is a tape library 600 containing nine tape cassettes, such as cassette [1] 621, wherein each tape cassette has a certain amount of storage capacity, in addition to containing three tape drives being tape drive A 602, tape drive B 604 and tape drive C 606. The host computer 202 could then issue a command to load three target tapes, tapes [1] 621, [2] 622 and [3] 623, into the target tape drives A 602, B 604 and C606 respectively. The loading operation in the tape library 600 can be accomplished with a robotic system for moving a target tape, such as tape cassette [1] 621, from an archive location, such as 306, generally in the library 600 to a target tape drive, such as A 602, whereby the target tape [1] 621 is typically inserted in an opening in the target tape drive A 602, such as shown in FIG. 5A for example, where storing and retrieving information can take place. In response to the issued command from the host computer 202, the interface bridge processor 212 could select the loaded drives in position [2] 222, [3] 223 and [4] 224 and assign the designation that they are virtually the target tapes [1] 621, [2] 622 and [3] 623 loaded in the target tape drives A 602, B 604 and C606 respectively. Referring back to FIG. 4, the loaded drives [2] 222, [3] 223 and [4] 224 are the loaded tape drive 404, and two loaded disc drive magazine docking stations 406. The interface bridge processor 212 could then respond to the host 102 that the tape loading command to load target tapes [1] 621, [2] 622 and [3] 623 into target tape drives A 602, B 604 and C606 respectively is accomplished. The host 102 could then initiate a storage related command, such as to read or write data for example, as if the storage system 200 were the tape library 600. Hence, a loaded drive, such as a loaded disc drive magazine docking station 406, can be selected and activated by the interface bridge processor 212 which can eliminate conventional robotic tape cassette manipulation for use with a tape drive in a conventional tape library. In another embodiment of this example, tape cassettes could be substituted by any other tape article, such as a tape article configured as a tape magazine article 301 without departing from the present invention.

On advantage of the embodiments described in FIG. 6 is that the storage system 200 adapted to save data on each mobile media element, such as the disc drive magazine 500, autonomously. Autonomous data on a mobile media element enables the archiving of each media element in an off-site location for safe keeping, for example. This facilitates a replenishment of media elements enabling the storage system 200 access to unlimited, cost-effective storage capacity, which is one of the benefits of a tape library. Furthermore, by selecting a loaded drive by simply assigning an address by means of an interface bridge processor 212 can eliminate robotic systems physically positioning tape articles for use with a drive, thus enhancing efficiency and reliability in the storage system 200. Finally, because the media elements are not limited to tape, such as 410, inherent strengths of different kinds of media can be taken advantage of depending on the needs of a user.

Figure 7:
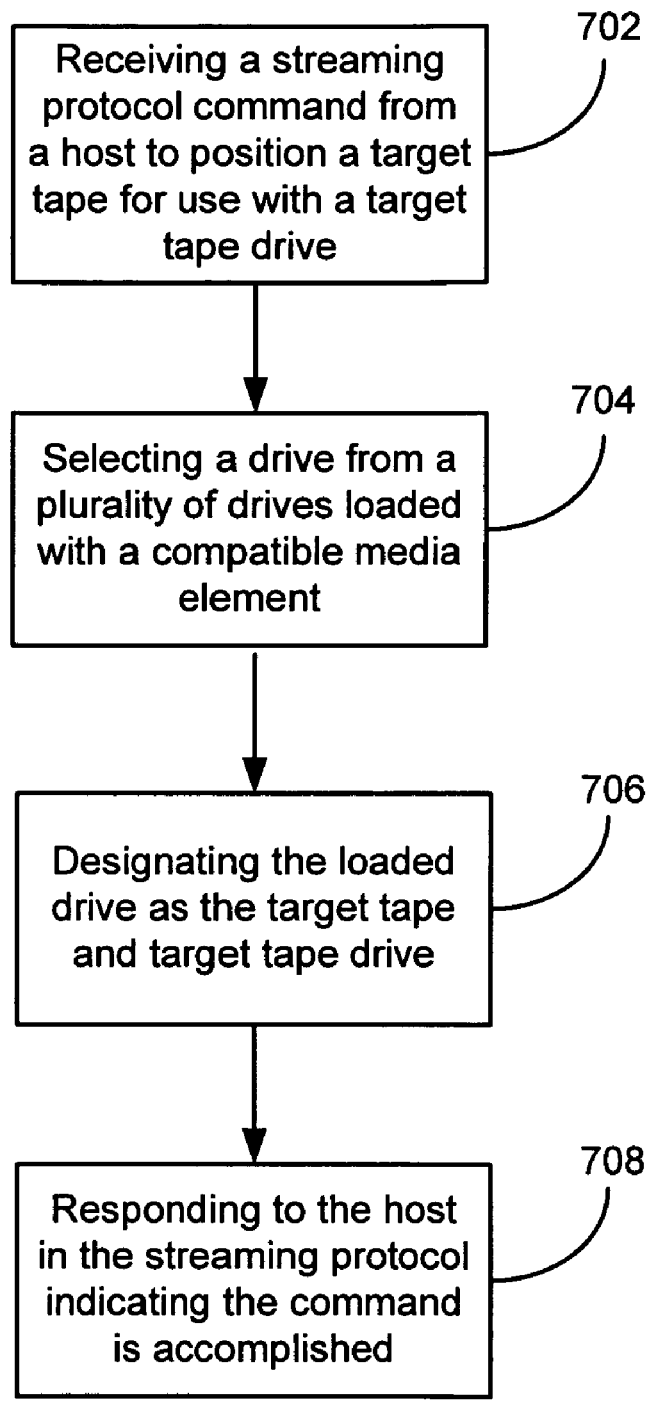
FIG. 7 shows a flow diagram of a method for using a variable media tape based storage system in accordance with an embodiment of the present invention.

Referring now to FIG. 7, shown therein is a method to practice an embodiment of the present invention. It should be recognized that the steps presented in the described embodiments of the present invention do not require any particular sequence. In step 702, the storage system 200 receives a streaming protocol command from a host 202 to position a target tape, such as [1] 621, for use with a target tape drive, such as tape drive A 602. A means for receiving the streaming protocol command could be over wire lines, such as cable, or wireless, such as RF, just to name a couple examples, whereby an interface bridge processor 212 could be adapted to receive the command for the storage system 200, for example. In step 704, one of a plurality of drives loaded with a compatible media element is selected. The loaded drive, as previously disclosed, is a drive and compatible mobile media element configured to operate as a functional pair. A means for selecting a loaded drive with a compatible media element could be by an algorithm (such as a software program for example) for use with the interface bridge processor 212, for example. As shown in block 706, the storage system 200 designates the selected loaded drive as if it were the target tape and the target drive. A means for designating the selected loaded drive could be performed by a switching circuit disposed in the interface bridge circuit 212 backed by a software address allocation routine capable of determining which loaded drive (wherein the loaded drives would be configured to have addresses) in the storage system 200 would be appropriate, just to name one example. The final block 708 is a step in which the storage system 200 responds to the host 202 in the streaming protocol (that the host 202 understands) indicating that the command in the receiving step 704 is accomplished. A means for responding to the host 202 could be done through the interface bridge circuit 212 in the streaming protocol that is understood by the host 202, for example.

Figure 8:
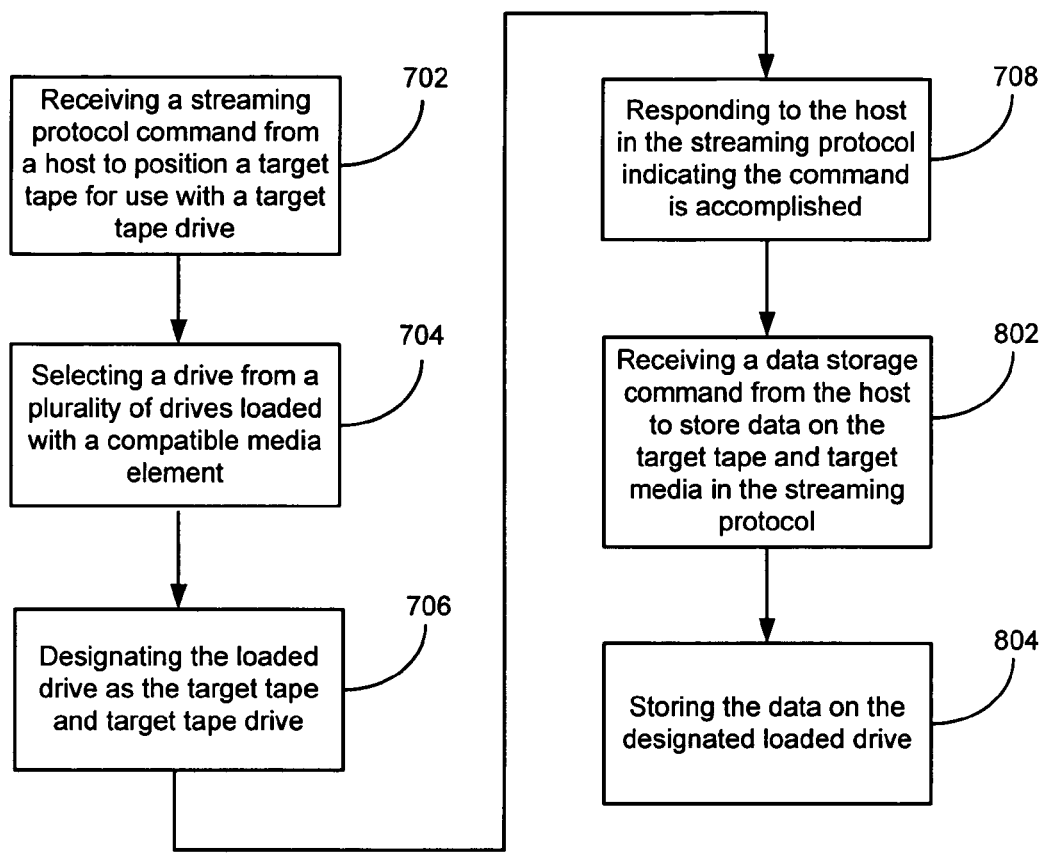
FIG. 8 shows an alternative embodiment of FIG. 7 wherein receiving and storing data steps are included in accordance with an embodiment of the present invention.

FIG. 8 is an alternative embodiment of the present invention which includes method steps 702, 704, 706 and 708 from FIG. 7. Step 802 is a block in which the storage system 200 receives a data storage command from the host 202 to store data on the target tape with the target tape drive in streaming protocol. A means for receiving the data storage command could be one of the embodiments of the means described for step 704. In step 804, the storage system 200 stores the data from step 802 on the designated loaded drive from step 706. A means for storing the data could be accomplished by a loaded disc drive magazine docking station in communication 206 with an interface bridge circuit such as over a SCSI wire system using a protocol that is supported by the disc drive magazine docking station and the SCSI wire system, for example.

Figure 9:
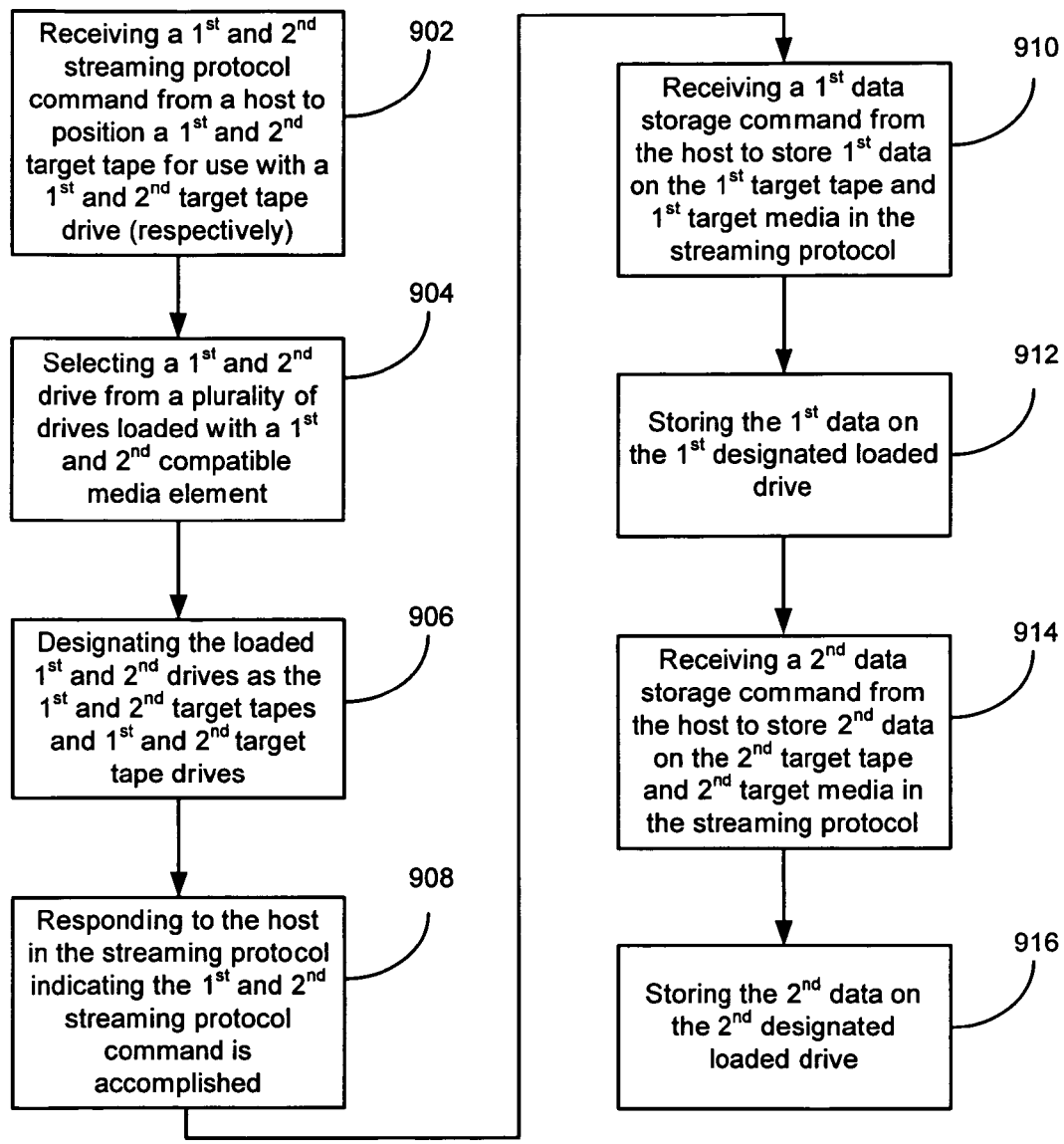
FIG. 9 shows an alternative method for FIG. 8 wherein the steps illustrate using the storage system with multiple storage elements consistent with embodiment of the present invention.

FIG. 9 is another alternative method to practice the present invention. In step 902 of this embodiment, the storage system 200 receives a first and second streaming protocol command from a host 202 to position a first target tape, such as [1] 621, for use with a first target tape drive, such as tape drive A 602, and a second target tape, such as [2] 622, for use with a second target tape drive, such as tape drive B 604 respectively. A means for receiving the streaming protocol command could be one of the embodiments of the means described for step 702. In step 904, a first loaded drive and second loaded drive from a plurality of drives having a first and second compatible media element are selected. A means for loading the drives with the compatible media could be one of the embodiments of the means described for step 704. In step 906, the storage system 200 designates the selected first and second loaded drives as if they were the first and second target tapes and target drives, respectively. A means for designating the selected loaded drive could be one of the embodiments of the means described for step 706. In step 908, the storage system 200 responds to the host 202 in the streaming protocol (which the host 202 understands) indicating that the first and second commands in the receiving step 904 is accomplished. A means for responding to the host 202 could be one of the embodiments of the means described for step 708. Step 910 is a block in which the storage system 200 receives a first data storage command from the host 202 to store first data on the first target tape with the first target tape drive in streaming protocol. In step 912, the storage system 200 stores the first data from step 910 on the first designated selected loaded drive from step 906. Step 914 is a block in which the storage system 200 receives a second data storage command from the host 202 to store second data on the second target tape with the second target tape drive in streaming protocol. In step 916, the storage system 200 stores the second data from step 914 on the second designated selected loaded drive from step 906. A means for receiving the data storage commands could be one of the embodiments of the means described for step 704. A means for storing the data could be one of the embodiments of the means described for step 804.

Embodiments of the present invention could be commercially practiced with a storage system 200 configured like the combination tape and disc drive magazine storage system 400 of FIG. 4 with RXT disc drive removable RAID magazines and RXT docking stations both produced by Spectra Logic Corporation of Boulder, Colo. and also with LTO-2 tape cassettes and LTO-2 tape drives from IBM Corporation of Dallas, Tex. The storage system 200 can be equipped with an interface bridge processor 212 primarily comprised of a QIP (Quad Interface Processor) from Spectra Logic Corp., adapted to receive and respond to a tape iSCSI (internet Small Computer System Interface) protocol communications, such as one provided by Veritas Corporation of Sunnyvale, Calif., from a host 202, such as a server system. The interface bridge processor 212 can also be adapted to translate the iSCSI protocol to a protocol supported by the storage system 200, such as a fiber channel protocol, and vise versa. The storage system 200 can further comprise bays where the LTO-2 tape drives and the RXT disc drive docking stations can be installed. Each bay can be assigned an address that can be translated through to whatever drive may reside in the bay. In addition, each bay can have a connector that connects the LTO-2 tape drive or the RXT disc drive docking station to a fiber channel line, or other, that connects to the interface bridge circuit 212 creating the communications path 206 between the interface bridge circuit 212 and the drives. The storage system 200 can have an on-board computing system that operates with the interface bridge processor 212 containing software to identify the state of each bay, such as empty without a drive, empty but containing a drive without media or a drive loaded with media. Further, the software can be operable to designate loaded drives in the place of target tapes to be positioned for use with target tape drives as generally instructed by the tape protocol. The interface bridge processor 212 can then be equipped to communicate back to the host 202 as if it were a tape library indicating that target tapes have been positioned for use with target drives and the storage system 200 is ready for reading and writing data to the target tapes.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, storage system 200 may vary depending on the types of particular drives and media, such as the disc drive magazine docking station 408 and disc drive magazine media elements 500, the number of drives, and the manner in which the drives are ordered, the adaptability to enlarging the storage system 200 or combining multiple storage systems 200 with varying configurations and still maintain substantially the same functionality without departing from the scope and spirit of the present invention. Further, the target tape article could simply be a single tape cassette, such as the cassette 342, or an entire tape magazine article, such as the tape magazine 301 without departing from the scope and spirit of the present invention. Additionally, the functionality of the interface bridge processor, such as 212, may be in the form of a board, a chip, a switching and mapping system or equivalence, while maintaining substantially the same functionality without departing from the scope and spirit of the present invention. Finally, although the preferred embodiments described herein are directed to storage systems, such as libraries, and related technology, it will be appreciated by those skilled in the art that the teachings of the present invention can be applied to other systems, without departing from the spirit and scope of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A variable media tape based storage system comprising:
   a first and a second non-tape drive loaded with respective first and second compatible mobile storage elements wherein said first and second compatible mobile storage elements are capable of being unloaded from said respective non-tape drives;
   a mapping means capable of generating a map of said loaded first and said loaded second non-tape drives as at least a first and a second virtual tape cassette that are each disposed in a virtual tape storage location, said virtual tape cassettes for being loaded in a first virtual tape drive;
   an interface processor for linking said storage system to a host wherein said interface processor is capable of providing said map of said first and second virtual tape cassettes and said first virtual tape drive to said host for storing data.

2. The variable media tape based storage system of claim 1 further capable of fulfilling storage commands for storing data received in tape protocol by said host on said first and second virtual tape cassettes.

3. The variable media tape based storage system of claim 2 wherein said interface processor is capable of converting said tape protocol to a different communication protocol to communicate with said first and second loaded non-tape drives.

4. The variable media tape based storage system of claim 1 further comprising a third and fourth non-tape drive loaded with respective third and fourth compatible mobile storage elements and said third and fourth non-tape drives mapped as a third and fourth virtual tape cassette each disposed in a third and fourth respective virtual storage location, said third and fourth virtual tapes are for use with a second virtual tape drive.

5. The variable media tape based storage system claim 4 further capable of fulfilling additional storage commands for storing additional data received in said tape protocol by said host on said third and fourth virtual tape cassettes.

6. The variable media tape based storage system claim 1 further comprising a switch system on each of said non-tape drives adapted to indicate whether or not said non-tape drive can be mapped as one of said virtual tape cassettes and virtual tape drive.

7. The variable media tape based storage system of claim 6 wherein said switch system and map system are functionally comprised in an interface bridge processor.

8. The variable media tape based storage system of claim 6 wherein said switch system and map system are disposed with one of said non-tape drives.

9. The variable media tape based storage system of claim 1 wherein said first and second mobile storage elements are mobile disc drive magazines and said first and second drives are disc drive magazine docking stations.

10. The variable media tape based storage system of claim 9 further comprising at least one tape cassette and one tape drive adapted to store data on said tape cassette.

11. The variable media tape based storage system of claim 1 wherein said mobile storage element is selected from a group of media consisting of: digital magnetic floppy disc, digital compact disc, digital flash memory device, and mobile disc drive magazine.

12. A method for using a variable media tape based storage system comprising:
   loading a first mobile storage element in a cooperating relationship with a first non-tape drive;
   switching identification of said first loaded non-tape drive to a first virtual target tape drive and a first virtual target tape article that is disposed in a virtual storage location;
   receiving a command in streaming protocol from a host to position said first target tape article for use with said first target tape drive;
   selecting said first loaded non-tape drive from a plurality of non-tape drives loaded with compatible mobile storage elements as said first virtual target tape article in said first virtual storage location;
   responding to said host in said streaming protocol affirming said command is accomplished; and
   unloading said first mobile storage element from said first drive.

13. The method of claim 12 further comprising:
   receiving a data storage command from said host to store data on said first target tape article with said first target tape drive in said streaming protocol; and
   storing said data on said loaded first non-drive and first mobile storage element; and
   responding to said host in said streaming protocol that said storage of data is completed and said first target tape article is no longer positioned for use with said first target drive.

14. The method of claim 13 further comprising:
   receiving a second command in said streaming protocol from said host to position a second target tape article for use with said first target tape drive;
   selecting a second non-tape drive from said plurality of non-tape drives with a second compatible storage element;
   designating said loaded second non-tape drive with said second compatible storage element as said second target tape article positioned for use with said first target tape drive;
   responding to said host in said streaming protocol affirming said second command is accomplished; and
   storing said second data on said designated loaded second non-tape drive.

15. The method of claim 12 wherein said designation step is accomplished by making an address assignment through an interface bridge processor.

16. The method of claim 12 wherein said storing step is done by a protocol other than said streaming protocol.

17. The method of claim 12 wherein said virtual tape article is selected from the group consisting of: a tape magazine, a tape cassette.

18. A data storage system comprising:
   a plurality of non-tape drives wherein at least a first and second non-tape drive are loaded with a respective first and second compatible mobile storage element, said first and second compatible mobile storage elements capable of being unloaded from said respective first and second non-tape drives; and
   an interface processor capable of designating said at least first and second loaded non-tape drives as first and second virtual tape magazines, wherein each of said virtual tape magazines is capable of accommodating a plurality of virtual tape cassettes, said interface processor capable of making said data storage system function as a virtual tape library wherein said first and second loaded drives can each function as a common virtual tape drive adapted to store data for a host on said virtual tape cassettes from said first and second virtual tape magazines.

* * * * *